United States Patent

[11] 3,620,767

| [72] | Inventor | William E. Swartz<br>McKeesport, Pa. |
|---|---|---|
| [21] | Appl. No. | 883,232 |
| [22] | Filed | Dec. 8, 1969 |
| [45] | Patented | Nov. 16, 1971 |
| [73] | Assignee | Calgon Corporation<br>Continuation-in-part of application Ser. No. 795,056, Jan. 29, 1969, now abandoned, which is a continuation-in-part of application Ser. No. 617,474, Feb. 21, 1967, now abandoned.<br>The portion of the term of the patent subsequent to Feb. 3, 1987, has been disclaimed. |

[54] BONITO PROCESSING
9 Claims, No Drawings

| [52] | U.S. Cl. | 99/111 |
|---|---|---|
| [51] | Int. Cl. | A23l 1/325 |
| [50] | Field of Search | 99/111, 188, 160, 159, 158, 157, 150, 222, 224, 195 |

[56] References Cited
UNITED STATES PATENTS

| 2,555,236 | 5/1951 | Kreidl et al. | 99/188 |
|---|---|---|---|
| 3,036,923 | 5/1962 | Mahon | 99/195 |
| 3,104,170 | 9/1963 | Mahon | 99/107 |
| 3,207,608 | 9/1965 | Brown et al. | 99/107 |
| 3,493,392 | 2/1970 | Swartz | 99/111 |

OTHER REFERENCES

Tressler et al., Marine Products of Commerce, 2nd Ed., 1951, pages 445–446

*Primary Examiner*—Joseph Scovronek
*Assistant Examiner*—Stephen B. Davis
*Attorney*—Buell, Blenko & Ziesenheim

ABSTRACT: Previously frozen bonito is treated prior to cooking with a molecularly dehydrated phosphate such as sodium tripolyphosphate or an orthophosphate so as to increase the yield of cooked bonito meat.

BONITO PROCESSING

This application is a continuation-in-part of my copending application Ser. No. 795,056 filed Jan. 29, 1969, now U.S. Pat. No. 3,493,392 which is in turn a continuation-in-part of my application Ser. No. 617,474, filed Feb. 21, 1967 now abandoned. Those applications relate to the processing of tuna, which is classified in the United States in a different class than bonito.

This invention relates to bonito processing and particularly to a method of treating bonito to improve the yield, taste and texture of the light meat.

Bonito, which is similar to the tuna family, is a fish of generally high oil content. In general, the light meat of the bonito is canned and sold for human consumption, while the dark portion of the bonito is sold as cat food or otherwise used in animal food mixtures. Obviously, it is highly desirable economically to be able to increase the yield of bonito meat.

I have found surprisingly, that, if bonito is pumped with a solution of a molecularly dehydrated phosphate or an orthophosphate alone or in admixture with salt, the yield of bonito meat can be increased markedly as compared to the yield of untreated bonito where the cooking is carried out in steam alone. In addition to the increased yield of the meat, the flavor and odor are more delicate being less "fishy." Moreover, the cooked meat is more tender and less dry in the treated as compared to untreated bonito.

Preferably, I pump a solution of salt and molecularly dehydrated phosphate, such as sodium tripolyphosphate or mixtures of sodium tripolyphosphate and sodium hexametaphosphate, or sodium pyrophosphate or a solution of sodium orthophosphate into the thawed flesh of the bonito before cooking to provide a level of about 0.5 percent added to use a solution of salt and phosphate, I have found that the phosphate alone will also provide marked improvement in yield of bonito meat as well as in flavor and odor, although not to the degree generally achieved by the salt-phosphate mixture. The level of phosphate addition should preferably be between 0.1 and 1.0 percent.

The invention is peculiarly advantageous in its effect on bonito meat yield. I do not propose to attempt an explanation of this peculiar advantage but simply point out that it is a very surprising but extremely important commercial advantage.

The invention will perhaps be better understood by reference to the following examples.

EXAMPLE 1

Four frozen bonito were thawed in ice water overnight to an internal temperature of approximately 33° F. The fish were then weighed and pumped with a manual stitch pumper at 40 lb. pressure using a three-needle manifold. Injection was at 1 inch intervals first on one side of the bonito and then on the other. The fish were then drained, weighed and cooked at the same time at 220° F. for 1 hour 15 minutes. They were then cooled at room temperature and weighed. Phosphate and salt phosphate in the flesh and thereafter, I cook the bonito as usual and remove the meat in the usual manner. While I prefer analyses were run on the cooked meat. The data appears in table I.

TABLE I

| Sample | Treatment | Pump | Cook[1] yield | $P_2O_5$ | Added phosphate | Salt |
|---|---|---|---|---|---|---|
| 1 | 5% tripoly | 10.1 | 91.1 | 0.92 | 0.59 | 0.20 |
| 2 | 5% tripoly and 10% salt. | 5.7 | 87.3 | 0.84 | 0.45 | 1.42 |
| 3 | None | | 85.0 | 0.57 | | 0.21 |
| 4 | 5% meta | 5.1 | 88.2 | 0.91 | 0.48 | 0.17 |

[1] Based on initial raw weight.

EXAMPLE 2

Four frozen bonito were cut in half lengthwise with a bandsaw. The halves were then placed in plastic bags, thawed at room temperature and stored overnight at room temperature.

Halves were then weighed and stitch pumped at 30 p.s.i.g. with either 7 percent of a blend of tripolyphosphate plus hexametaphosphate, 10 percent salt, 7 percent of a blend of tripolyphosphate and metaphosphate plus 10 percent salt, or tapwater. Halves were then drained 5 minutes and reweighed. Saran was placed on the open flesh side of each half and then halves of the same fish were placed together and trussed up with string. All "reformed" fish were placed in the autoclave and cooked at 220° F. for 1 hour 5 minutes. They were then cooled and stored at room temperature. Samples for TBA analysis were taken at 6, 24, and 30 hour periods. The sampling was done on the layer of flesh within one-half inch of the skin surface. Only light meat was taken for analysis. The data are reported in table II.

TABLE II.—POLYPHOSPHATE TREATMENT OF BONITO HALVES

| Whole sample | Half sample | Treatment | Pump | Cook[1] yield | TBA values 6 hr. | 24 hr. | 30 hr. | $P_2O_5$ | Added polyphosphate [2] | Salt | Protein | Moisture |
|---|---|---|---|---|---|---|---|---|---|---|---|---|
| I | A | None | | 90.8 | 2.4 | 4.4 | 6.8 | 0.63 | | 0.20 | 25.3 | 71.8 |
|   | B | 7% polyphosphate [2] | 7.2 | 94.4 | 1.7 | 3.5 | 3.8 | 0.92 | 0.48 | 0.26 | 23.9 | 71.4 |
| II | A | 7% polyphosphate [2] | 9.2 | 95.6 | 1.0 | 1.8 | 2.3 | 0.88 | 0.41 | 0.35 | 25.0 | 71.9 |
|   | B | 7% polyphosphate,[2] 10% salt | 10.1 | 91.3 | 1.0 | 1.7 | 2.4 | 0.92 | 0.49 | 1.38 | 23.7 | 73.4 |
| III | A | 10% salt | 6.5 | 96.8 | 1.2 | 4.8 | 4.9 | 0.54 | | 1.04 | 22.6 | 69.9 |
|   | B | 7% polyphosphate,[2] 10% salt | 10.2 | 98.7 | 1.1 | 2.5 | 3.0 | 0.85 | 0.37 | 1.27 | 23.3 | 69.0 |
| IV | A | Water pump[3] | (3) | 91.7 | 3.6 | 5.8 | 6.2 | 0.54 | | 0.35 | 23.7 | 62.0 |
|   | B | 7% polyphosphate,[2] 10% salt | 9.5 | 101.0 | 1.7 | 2.8 | 2.9 | 0.84 | 0.35 | 1.49 | 21.7 | 65.0 |

[1] Based on initial weight.
[2] Blend of sodium tripolyphosphate and sodium hexametaphosphate.
[3] Value not obtained.

EXAMPLE 3

Chunks of bonito meat weighing about 3 lbs. each were taken from equivalent sections of a single bonito and used in a flavor evaluation of the polyphosphate treatment. One of the chunks was injected with 5 percent of a blend of tripolyphosphate and hexametaphosphate plus 10 percent salt. The other chunk was left untreated. Both chunks were cooked in the autoclave for 45 minutes at 220° F. The final internal temperature of the chunks was 184° F.

The chunks were stored at room temperature for 18 hours and TBA samples were taken in surface layers of the meat. Tasting at this point indicated the treated to be quite superior in texture and in juiciness. The untreated tasted chewy and dry.

Now the light-cooked meat from each chunk was packed into 6-1/2 ounce size cans. The treated cans were filled with hot water and sealed. The control cans had an amount of salt added equivalent to that pumped into the treated meat and then they were filled with hot water and sealed The cans were now retorted at 240° F. for 75 minutes. After cooling they were opened and tasted and TBA values were again determined.

Tasters felt that both samples were somewhat soggy from too much water in the cans. However, the treated were judged better in texture and taste than the controls. The controls were judged slightly rancid in taste. TBA values clearly support the differences in rancidity for treated compared to control as shown below:

TBA VALUES IN COOKED BONITO

| Sample | Precooked, 18 Hrs. | Retorted & Canned |
|---|---|---|
| Control | 16 | 2.7 |
| Treated | 2.9 | 1.7 |

The data show that in every case in examples 1 and 2, samples injected with polyphosphate had significantly higher yield than comparable controls. In the "whole fish" experiment, the control value was 85 percent yield and the treated values ranged from 88.2 to 91.1 percent yield. In the split halves experiment, all the treated halves were higher in yield than comparable control halves.

The data in table II show a definite control of TBA buildup in the samples that have been treated with polyphosphates. Although individual values vary from fish to fish, when the equivalent halves of a single fish are compared, in every case the control TBA values have risen at a significantly faster rate.

In example 3 the rise in TBA value has been correlated with taste. In that case we see that the high TBA values are associated with rancid tastes, and that although retorting lowers TBA values, the differences in taste between treated and control are still noticeable.

A lower percent moisture in fish IV (see table II) is due to a significantly higher fat content in this fish compared to the others.

It will be seen from the foregoing examples that the addition of molecularly dehydrated phosphate and mixtures of molecularly dehydrated phosphate and salt showed marked improvement in bonito meat yields over bonito cooked without polyphosphate or pumped with an equal amount of water.

The TBA values are indicative of the oxidation or rancidity development of the oils in the fish. The rancidification of the oil causes the fish to give off an undesirably fishy odor and to develop a strong taste. This tendency is markedly reduced by my treatment, resulting in more delicate odor and taste as well as better keeping qualities.

While I have illustrated and described certain preferred practices of my invention in the foregoing specification, it is to be understood that this invention may be otherwise embodied within the scope of the following claims.

I claim:

1. The method of treating frozen bonito to provide greater yields of subsequently cooked bonito meat which comprises the step of incorporating by pumping into said bonito flesh after thawing and prior to cooking at least 0.1 percent by weight of a phosphate selected from the group consisting of molecularly dehydrated phosphates and orthophosphates.

2. The method of treating bonito as claimed in claim 1 wherein the molecularly dehydrated phosphate is incorporated into said bonito by pumping an aqueous solution of said phosphate and salt into the bonito flesh.

3. The method of treating bonito as claimed in claim 1 wherein the phosphate is a molecularly dehydrated phosphate.

4. The method of treating bonito as claimed in claim 1 wherein the phosphate is one or more of the group consisting of sodium tripolyphosphate and sodium hexametaphosphate.

5. The method of treating bonito as claimed in claim 1 wherein the phosphate is a mixture of sodium orthophosphate and sodium pyrophosphate.

6. The method of treating bonito as claimed in claim 1 wherein phosphate in an amount between about 0.1 to 1.0 percent is incorporated in the bonito prior to cooking.

7. The method of treating bonito as claimed in claim 1 wherein the phosphate consists of a major portion of sodium tripolyphosphate.

8. The method of treating bonito as claimed in claim 1 wherein the phosphate is an orthophosphate.

9. The method of treating bonito as claimed in claim 1 wherein the phosphate is a pyrophosphate.

* * * * *

UNITED STATES PATENT OFFICE
CERTIFICATE OF CORRECTION

Patent No. 3,620,767  Dated November 16, 1971

Inventor(s) William E. Swartz

It is certified that error appears in the above-identified patent and that said Letters Patent are hereby corrected as shown below:

Column 1, line 33, after "added" insert -- phosphate in the flesh and thereafter, I cook the bonito as usual and remove the meat in the usual manner. While I prefer -- . Column 2, lines 1 and 2, delete "phosphate in the flesh and thereafter, I cook the bonito as usual and remove the meat in the usual manner. While I prefer" ; line 75, after "sealed" insert a period.

Signed and sealed this 17th day of October 1972.

(SEAL)
Attest:

EDWARD M. FLETCHER, JR.
Attesting Officer

ROBERT GOTTSCHALK
Commissioner of Patents